March 3, 1931.　　　W. L. LLOYD, JR　　　1,795,176
CAPACITANCE CONNECTION TO HIGH VOLTAGE LINES
Filed Dec. 1, 1928

Inventor:
Will L. Lloyd, Jr.
by Charles E. Tullar
His Attorney.

Patented Mar. 3, 1931

1,795,176

UNITED STATES PATENT OFFICE

WILL L. LLOYD, JR., OF PITTSFIELD, MASSACHUSETTS, ASSIGNOR TO GENERAL ELECTRIC COMPANY, A CORPORATION OF NEW YORK

CAPACITANCE CONNECTION TO HIGH-VOLTAGE LINES

Application filed December 1, 1928. Serial No. 323,172.

My invention relates to capacitance connections to high voltage lines whereby a relatively lower voltage may be obtained for the operation of relays, meters and the like, and its purpose is to provide such a connection in which the measurement voltage is independent of the variable leakage current caused by dirt, moisture and the like on the insulator elements.

It is known that a string of insulators connected between a high voltage line and ground acts as a string of condensers and that this string may be tapped to obtain a measurement voltage proportional to, but lower than, the line voltage. However, difficulties have been encountered with this type of connection due to the variable leakage current caused largely by dirt and moisture collecting on the insulator string. The capacity measurement connection as heretofore employed has permitted these variable leakage currents to flow through the measurement circuit. The variable leakage current changes the voltage distribution on the insulator string, thus changing the measurement calibration and the variable leakage current which is superimposed upon the capacity measurement current produces undesirable results particularly where a low voltage measurement tap is used.

According to my invention I provide in combination with an insulator string what is in effect an air condenser comprising large grading rings included in and supported by the ordinary insulator string. A tap to ground is made from a point in the insulator string which is slightly above the voltage of the lower grading ring so that the variable leakage currents as well as the charging current of the insulator string flows through this ground connection and not through the measurement circuit which is connected to lower voltage grading ring. The measurement voltage and current is then independent of the voltage distribution on the string and free from the influence of leakage currents.

Figure 1:
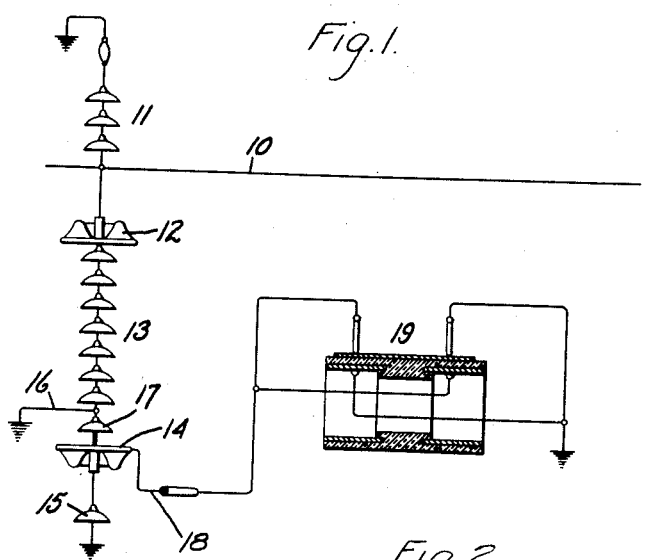
Figure 2:
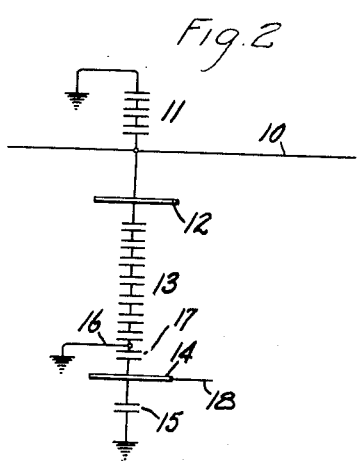

The features of my invention which are believed to be novel and patentable will be pointed out in the claims appended hereto. For a better understanding of my invention reference is made in the following description to the accompanying drawing which shows in Fig. 1 the preferable arrangement of my invention where the measurement circuit includes a surge voltage recorder; and Fig. 2 represents the condenser distribution of the connection represented in Fig. 1.

Referring to the drawing, 10 represents a high voltage transmission conductor. 11 represents the ordinary supporting insulator string for the conductor 10. The measurement insulator string preferably includes a metallic grading ring 12 connected to the high voltage conductor 10, an intermediate insulator string 13, a lower voltage metallic grading ring 14 and one or more insulators 15 connected to ground. At some point above the voltage gradient of ring 14 the string 13 is connected to ground as represented at 16. When the transmission conductor 10 is not too far away from the lower ring 14 the upper ring 12 may be omitted since it will be evident that then the conductor 10 itself is largely equivalent to the ring 12 in its condenser effect with respect to ring 14. Owing to the size and character of rings 12 and 14 with respect to the units of the intermediate insulator string I obtain the effect of an air condenser between rings 12 and 14. In fact, if the insulator string 13 was not needed as a supporting structure for the connection it might be omitted. The relative condenser distribution is represented in Fig. 2. While the units of the intermediate insulator string 13 have a capacity effect it is small as compared with that between rings 12 and 14. The variable leakage current through the insulator string due to dirt and moisture as well as the charging current of the string is removed by the ground connection 16. The voltage on the lower ring 14 is then independent of the voltage distribution of the string 13 and the only voltage on the lower ring is that due to the charging current coming through the air condenser. The relay or metering tap is connected to the lower ring which is maintained above ground potential by the insulator units 15 and 17. As represented, the tap 18 supplies a surge voltage recorder 19 although it might supply any other type of device. The current which will flow through the measurement circuit is due to the air condenser and is not influenced by the charging and leakage currents conveyed to ground through the shunt connection 16.

The multiplying factor of the measurement voltage can be readily changed as by changing the positions of the grading rings in the string, changing their size, or by changing the shunt capacities from the lower ring to ground.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In combination with a high voltage line, means for obtaining a measurement voltage therefrom consisting of conductor elements comprising an air condenser supported between said line and ground by a string of insulators, ground connections to said insulator string above and below the lower conductor element, and a measurement circuit connected to the lower conductor element.

2. In combination with a high voltage conductor, means for obtaining a measurement voltage therefrom comprising a grading ring forming one plate of an air condenser between said conductor and ground, a string of insulators between said conductor and ground in which said ring is supported, means for grounding said insulator string at a point intermediate the conductor and ring, and a measurement circuit connected to said ring.

3. A capacitance connected to a high voltage line, comprising in combination with such line a string of insulators connected between the line and ground, a pair of metallic grading rings in said insulator string one near the line connection and the other near the ground connection, a ground connection to said insulator string between said rings for shunting the insulator string charging and leakage current around the lower ring, and a measuring circuit connected to the lower ring.

4. In combination with a high voltage line an air condenser comprising spaced conductors connected between said line and ground, insulation means between and supporting said conductors in fixed relation to said line and a ground connection to said insulating means between said conductors for drawing off leakage currents.

In witness whereof, I have hereunto set my hand this twenty-fourth day of November, 1928.

WILL L. LLOYD, Jr.